United States Patent
Kim et al.

(10) Patent No.: US 11,491,859 B2
(45) Date of Patent: Nov. 8, 2022

(54) METHOD AND SYSTEM FOR CONTROLLING SEMI-ACTIVE ENGINE MOUNT

(71) Applicants: Hyundai Motor Company, Seoul (KR); Kia Motors Corporation, Seoul (KR)

(72) Inventors: Jang Ho Kim, Gyeonggi-do (KR); Ki Won Lee, Gyeonggi-do (KR); Jae Keun Jeon, Gyeonggi-do (KR); Jun Haeng Heo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 108 days.

(21) Appl. No.: 17/035,232

(22) Filed: Sep. 28, 2020

(65) Prior Publication Data
US 2021/0260980 A1 Aug. 26, 2021

(30) Foreign Application Priority Data
Feb. 26, 2020 (KR) .......... 10-2020-0023287

(51) Int. Cl.
*B60K 5/12* (2006.01)
*F16F 15/027* (2006.01)

(52) U.S. Cl.
CPC .......... *B60K 5/1283* (2013.01); *F16F 15/027* (2013.01); *F16F 2230/18* (2013.01)

(58) Field of Classification Search
CPC ... B60K 5/1283; B60K 5/1208; F16F 15/027; F16F 2230/18; F16F 15/002; F16F 13/14

USPC ......................................................... 248/550
See application file for complete search history.

(56) References Cited

U.S. PATENT DOCUMENTS

| | | | | |
|---|---|---|---|---|
| 5,905,317 A | * | 5/1999 | Aoki | F16F 13/22 267/140.14 |
| 6,120,012 A | * | 9/2000 | Shibata | F16F 13/26 267/140.14 |
| 2002/0066985 A1 | * | 6/2002 | Muramatsu | F16F 13/26 267/136 |
| 2017/0276208 A1 | * | 9/2017 | Kim | F16F 13/26 |

(Continued)

FOREIGN PATENT DOCUMENTS

| KR | 20050022183 A | 3/2005 |
|---|---|---|
| KR | 20090086566 A | 8/2009 |

(Continued)

*Primary Examiner* — Muhammad Ijaz
(74) *Attorney, Agent, or Firm* — Fox Rothschild LLP

(57) ABSTRACT

A method for controlling a semi-active engine mount is provided to increase both NVH performance and driving performance of a vehicle and reduce noise and vibration generated under specific driving conditions. The method includes storing real-time vehicle speed data at intervals of a predetermined time and determining whether an engine is in an idling state. In response to determining that the engine is in the idling state, determining whether a current driving state of the vehicle corresponds to predetermined conditions in which noise and vibration performance is prioritized based on vehicle speed change information. The semi-active engine mount is adjusted to be in an on state, upon determining that the current driving state of the vehicle in the idling state of the engine corresponds to the predetermined conditions.

6 Claims, 3 Drawing Sheets

(56) References Cited

U.S. PATENT DOCUMENTS

2017/0297403 A1\* 10/2017 Lee .................... B60G 17/016
2018/0354353 A1\* 12/2018 Dudar .................. B60W 10/06
2021/0260980 A1\* 8/2021 Kim .................... F16F 15/027

FOREIGN PATENT DOCUMENTS

| KR | 101753788 B1 | 7/2017 |
| KR | 101769301 B1 | 8/2017 |

\* cited by examiner

METHOD AND SYSTEM FOR CONTROLLING SEMI-ACTIVE ENGINE MOUNT

CROSS-REFERENCE TO RELATED APPLICATION

This application claims under 35 U.S.C. § 119(a) the benefit of priority to Korean Patent Application No. 10-2020-0023287 filed on Feb. 26, 2020, the entire contents of which are incorporated herein by reference.

BACKGROUND

(a) Technical Field

The present disclosure relates to a method and system for controlling an engine mount, and more particularly, to a method for controlling a semi-active engine mount which may increase both noise, vibration and harshness (NVH) performance and driving performance of a vehicle and prevent occurrence of noise and vibration in the mount under specific driving conditions of the vehicle.

(b) Background Art

As technologies applied to vehicles are being gradually developed and consumer demands for low vibration and low noise is increasing, efforts to maximize ride comfort by analyzing noise, vibration and harshness (NVH) performance of vehicles are underway. During operation of a vehicle, vibration of an engine occurring at a specific revolutions per minute (RPM) range is transmitted over a specific frequency to the interior of the vehicle through a vehicle body, and, in this case, the effect of an explosive component of the engine on the interior of the vehicle is substantial.

Therefore, engine mounts which support the engine of the vehicle and reduce noise and vibration generated by the engine are installed between the engine and the vehicle body, and the engine mounts are roughly classified into a rubber engine mount, an air-damped engine mount, and a fluid-filled engine mount. Thereamong, the fluid-filled engine mount is referred to as a hydraulic engine mount or a hydro engine mount, and has a structure in which a designated amount of a fluid is contained therein under an insulator and flows along a flow path between an upper fluid chamber and a lower fluid chamber to cause damping force.

Such a hydraulic engine mount is advantageous in that is may reduce both high-frequency vibration (low-amplitude vibration) and low-frequency vibration (high-amplitude vibration) depending on the situation. Recently, to improve vibration isolation characteristics of the hydraulic engine mount, active engine mounts and semi-active engine mounts in which an actuator may actively move an excitation plate vertically are being developed.

Thereamong, semi-active control engine mounts (semi ACMs), which be referred to as semi-active engine mounts, are configured such that characteristics of the mounts are controlled in an on/off manner, and a volume-stiffness type semi-active engine mount, in which behavior of a membrane is controlled, and a bypass type semi-active engine mount, in which a second flow path connecting an upper liquid chamber and a lower liquid chamber is separately provided and then controlled, are widely used. In the bypass type semi-active engine mount, a nozzle plate is installed between an insulator and a diagram, and this nozzle plate divides a space between the insulator and the diaphragm into the upper liquid chamber and the lower liquid chamber.

Further, in addition to a ring-shaped first flow path (first nozzle), the second flow path (second nozzle) having a shorter length and a greater cross-sectional area than the first flow path is formed in the nozzle plate. In this semi-active engine mount, a fluid flows based on an increase or a decrease in the internal volume of the upper liquid chamber when the insulator is elastically deformed due to movement of load and vibration transmitted from an engine, and in this process, vibration of a vehicle body is reduced.

In the semi-active engine mount, an electromagnetic actuator, in which an armature (plunger) moves vertically based on whether current is applied to a coil, and thus opens and closes the second flow path, is installed, and in this case, the second flow path is closed when the armature installed under the diaphragm is raised, and is opened when the armature is lowered. The semi-active engine mount reduces dynamic characteristics at an idle excitation frequency band by opening the second flow path which was closed during idling, thereby reducing the amount of vibration transmitted to the vehicle body through the mount.

However, the semi-active engine mount closes the second flow path during driving of the vehicle, thereby being operated in a manner that varies the characteristics thereof. The on state of the semi-active engine mount is a state in which current is output to the coil in the mount by a mount controller, i.e., a state in which operating current is applied to the coil by the mount controller. In a general semi-active engine mount system, a mount controller is configured to apply battery current to a coil to turn on the semi-active engine mount, when a predetermined mount-on condition is satisfied.

In the on state of the semi-active engine mount due to current applied to the coil, attractive force generated between the coil and the armature moves the armature downwards against the stiffness of a return spring and then fixes the armature, and thus, the second flow path (or a vent aperture) is opened. Accordingly, in the on state of the semi-active engine mount, the armature is incapable of closing the second flow path, and the membrane may be easily moved, and thus, the dynamic characteristics and damping performance of the semi-active engine mount are low.

On the other hand, the off state of the semi-active engine mount is a state in which current is not output to the coil in the semi-active engine mount by the mount controller, i.e., a state in which operating current is not applied to the coil. In the general semi-active engine mount system, the mount controller does not apply battery current to the coil to turn off the semi-active engine mount, when a predetermined mount-off condition is satisfied.

In the off state of the semi-active engine mount, due to interruption of current applied to the coil, the armature is moved upwards by the return spring and is then fixed, and thus the second flow path (or the vent aperture) is closed. Accordingly, in the off state of the semi-active engine mount, the armature closes the second flow path, the membrane is fixed thereby to not be easily moved, and thus, the dynamic characteristics and damping performance of the semi-active engine mount are high.

However, in the conventional semi-active engine mount system, to improve noise and vibration performance (hereinafter, referred to as "NVH performance"), the semi-active engine mount must be turned on to maintain low dynamic characteristics. If the dynamic characteristics are maintained low, the NVH performance of the vehicle is increased, but the damping performance of the mount is reduced and thus the driving performance of the vehicle is deteriorated. In general, the semi-active engine mount system is applied to improve the NVH performance of a vehicle during idling, and thus, deterioration in the damping performance of the mount when the dynamic characteristics of the mount are maintained low does not matter.

Additionally, NVH performance may be deteriorated while driving a vehicle under increased noise and vibration environments in a transmission lock-up condition, and, to mitigate the deterioration in the NVH performance while driving, it is required to mitigate deterioration in the damping performance of the mount while driving by extending the operation range of the mount from the conventional idle area to "the idle area+the driving area" to operate the semi-active engine mount system even while driving.

Further, when traveling on a bumpy road (e.g., uneven road surface), the semi-active engine mount may be turned on, and thus, a striking sound between the membrane (e.g., a decoupler) and the nozzle (e.g., a runner) may be produced. In particular, in the on state of the semi-active engine mount, the armature is incapable of closing the second flow path, the membrane is freely movable, and thus, the dynamic characteristics of the mount are reduced and the damping performance of the mount is also reduced, as described above. When the vehicle travels on an uneven road surface in this state, vibration of a high intensity is periodically input to the mount, and such vibration moves the membrane and hits an actuator case (particularly, a portion of the case forming the nozzle) and the nozzle, which are peripheral parts around the membrane, thereby generating noise and vibration.

The above information disclosed in this section is merely for enhancement of understanding of the background of the invention, and therefore it may contain information that does not form the prior art that is already known in this country to a person of ordinary skill in the art.

SUMMARY

The present invention provides a method and system for controlling a semi-active engine mount which further subdivides vehicle driving conditions to determine the on and off states of the mount in control logic of the mount compared to conventional vehicle driving conditions, and may thus increase both NVH performance and driving performance of a vehicle merely by improving the control logic without adding hardware, thereby being capable of extending an operating range of the semi-active engine mount so that a semi-active engine mount system used to improve the NVH performance only during idling may also be used to improve the NVH performance during driving, and reducing noise and vibration generated in the mount under specific driving conditions, such as when traveling on an uneven road.

In one aspect, the present invention provides a method for controlling a semi-active engine mount having a first flow path, a second flow path, and an actuator configured to open and close the second flow path, the method may include storing, by a mount controller, real-time vehicle speed data at intervals of a predetermined time, determining, by the mount controller, whether an engine is in an idling state, determining, by the mount controller, whether a current driving state of the vehicle corresponds to predetermined conditions in which noise and vibration performance is prioritized based on vehicle speed change information, in response to determining that the engine is in the idling state, and adjusting, by the mount controller, the semi-active engine mount to be in an on state so that the actuator opens the second flow path, in response determining that the current driving state of the vehicle in the idling state of the engine corresponds to the predetermined conditions in which noise and vibration performance is prioritized.

In an exemplary embodiment, the vehicle speed change information may include information regarding a change in a previous vehicle speed set to a vehicle speed at a predetermined time before a current time, and a change in a current vehicle speed. In determining whether the current driving state of the vehicle corresponds to the predetermined conditions in which noise and vibration performance is prioritized, the mount controller may be configured to determine that the current driving state of the vehicle corresponds to the predetermined conditions in which noise and vibration performance is prioritized when the current vehicle speed exceeds the previous vehicle speed.

In addition, in determining whether the current driving state of the vehicle corresponds to the predetermined conditions in which noise and vibration performance is prioritized, the mount controller may be configured to determine that the current driving state of the vehicle corresponds to the predetermined conditions in which noise and vibration performance is prioritized in response to determining that a condition 'the previous vehicle speed+G≤the current speed (G being a predetermined value)' is satisfied.

The method may further include adjusting, by the mount controller, the semi-active engine mount to be in an off state so that a closed state of the second flow path is maintained, in response to determining that the current driving state of the vehicle does not correspond to the predetermined conditions in which noise and vibration performance is prioritized. In addition, the mount controller may be configured to determine whether a current vehicle speed is within a predetermined range, in the idling state of the engine, and determine whether the current driving state of the vehicle corresponds to the predetermined conditions in which noise and vibration performance is prioritized and adjust the semi-active engine mount to be in the on state, in response to determining that the current vehicle speed is within the predetermined range.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
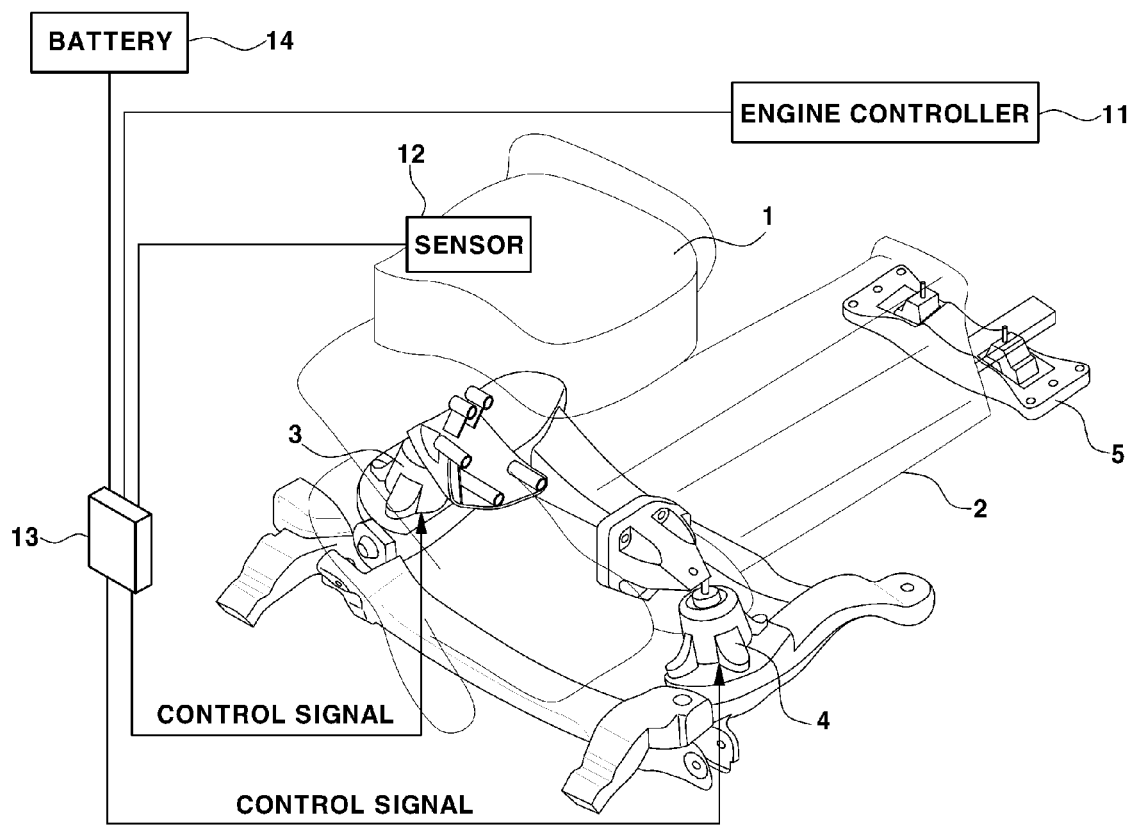
FIG. 1 is a view illustrating a semi-active engine mount system which may perform a control process according to the present invention.

It should be understood that the appended drawings are not necessarily to scale, presenting a somewhat simplified representation of various features illustrative of the basic principles of the invention. The specific design features of the present invention as disclosed herein, including, for

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a method for controlling an engine mount, and more particularly, to a method for controlling turning-on/off of a semi-active engine mount based on the driving state of a vehicle. Particularly, the present invention is characterized in that the driving conditions of the vehicle to determine the on and off states of the mount in control logic of the semi-active engine mount are further subdivided compared to conventional vehicle driving conditions.

As described above, to achieve NVH performance (noise and vibration performance) of a vehicle to which a semi-active engine mount system is applied, the semi-active engine mount must be turned on to reduce the dynamic characteristics of the semi-active engine mount, and to achieve driving performance of the vehicle, the semi-active engine mount must be turned off to increase damping performance of the semi-active engine mount.

However, if the semi-active engine mount is turned on, both the dynamic characteristics and the damping performance of the semi-active engine mount are reduced, and thus, the NVH performance of the vehicle is improved but the driving performance of the vehicle is deteriorated, and in contrast, if the semi-active engine mount is turned off, both the dynamic characteristics and the damping performance of the semi-active engine mount are improved, and thus, the driving performance of the vehicle is improved but the NVH performance of the vehicle is deteriorated.

Therefore, in a vehicle driving state in which the NVH performance of the vehicle must be considered, it is required to turn on the semi-active engine mount to reduce the dynamic characteristics of the mount, and in a vehicle driving state in which the driving performance of the vehicle must be considered, it is required turn off the semi-active engine mount to raise the dynamic characteristics of the mount. However, to do this, which one of the NVH performance and the driving performance of the vehicle is more important in the current situation must be determined, and a conventional engine mount system is incapable of improving both performances.

In the present invention, an area requiring improvement in the NVH performance is referred to as an 'accelerating booming' area, and pertains to a phenomenon in which vibration of an engine is transmitted to a vehicle body and thus increases noise when accelerating the vehicle, particularly, in the lockup-on state of a transmission, and to reduce such a phenomenon, the amount of vibration of the engine transmitted to the vehicle body must be decreased by reducing the dynamic characteristics of the mount.

Further, an area requiring improvement in the driving performance is referred to as a 'PT shake' area, and pertains to a phenomenon in which behavior of a powertrain (PT) is increased and thus transmits unpleasant vibration to a driver when the vehicle passes over a bump, and to reduce such a phenomenon, the behavior of the powertrain occurring while passing through the bump must reduced and the behavior of the powertrain which has already occurred must be rapidly eliminated by raising the damping characteristics of the mount.

Additionally, when the displacement of a membrane (a decoupler) is not restricted when traveling on an uneven road surface, the membrane hits a nozzle (e.g., a runner, a second flow path, etc.) and thus causes a striking sound, and to alleviate this phenomenon, the displacement of the membrane must be restricted by turning off the semi-active engine mount when travelling on the uneven road. To adjust the semi-active engine mount to improve both the NVH performance and driving performance of the vehicle and reduce noise when travelling on an uneven road, driving conditions (e.g., accelerating conditions) in which NVH performance is prioritized, driving conditions (e.g., PT shaking conditions) in which driving performance is prioritized, and whether the vehicle is being driven on an uneven road must be distinguished from one another based on vehicle driving information collected by the vehicle.

For this purpose, in the present invention, the above driving conditions and whether the vehicle is being driven on an uneven road may be determined using existing vehicle driving information collected by the vehicle without use of additional hardware, and a mount controller further subdivides vehicle driving conditions to determine the on and off states of the semi-active engine mount using the vehicle driving information compared to conventional vehicle driving conditions.

Hereinafter, a method for controlling a semi-active engine mount according to the present invention will be described in more detail with reference to the accompanying drawings.

FIG. 1 is a view illustrating a semi-active engine mount system which may perform a control process according to the present invention, for example, a semi-active engine mount system which supports a powertrain in a three-point supporting manner, in which an engine 1 is supported by two semi-active engine mounts 3 and 4 located on left and right sides LH and RH of the engine 1, and a transmission 2 may be supported by one transmission mount 5.

In the following description of the present invention, the terms 'semi-active mount' and 'mount' both refer to a semi-active engine mount that supports the engine 1 on a vehicle body unless stated otherwise, and the semi-active engine mount controlled or adjusted by the method according to the present invention is well known.

As shown in FIG. 1, the semi-active engine mount system which performs the control process according to the present invention may include a mount controller 13 configured to receive vehicle driving information, and the semi-active engine mounts 3 and 4, the turning on/off of which may be executed based on a control signal output from the mount controller 13. The mount controller 13 may be configured to determine whether the current vehicle driving state corresponds to mount-on conditions or mount-off conditions based on the vehicle driving information collected by a vehicle, and output a control signal to execute the turning-on/off of the semi-active engine mounts 3 and 4.

In particular, the vehicle driving information may include a vehicle power state IGN1, a vehicle speed (km/hr) and an engine RPM, and the mount controller 13 may be configured to receive information regarding the vehicle power state IGN1 from a battery controller or an engine controller 11. Further, the mount controller 13 may be configured to acquire information regarding the vehicle speed from a signal received from a sensor 12 configured to detect the vehicle speed (for example, a wheel speed sensor), or receive information regarding the vehicle speed from other controllers, for example, the engine controller 11.

In addition, the mount controller 13 may be configured to acquire the engine revolutions per minute (RPM) from a signal received from a sensor configured to detect the engine RPM (not shown), or may be configured to receive the engine RPM from the engine controller 11. The semi-active engine mounts 3 and 4 are provided such that the turning-on/off thereof may be adjusted based on a control signal output from the mount controller 13, and may include the two semi-active engine mounts 3 and 4 disposed on the left and right sides LH and RH of the engine 1 to support the engine 1.

In the present invention, the mount controller 13 may be configured to control the two semi-active engine mounts 3 and 4 disposed on the left and right sides LH and RH of the engine 1 to simultaneously turn on or off the two semi-active engine mounts 3 and 4 together. In the present invention, the on state of the semi-active engine mount refers to a state in which current is output to a coil (e.g., an actuator coil, not shown) in the mount in response to a control signal output from the mount controller 13, i.e., a state in which operating current is applied to a coil of each of the mounts 3 and 4 by the control signal from the mount controller 13.

In a general semi-active engine mount system, a driving circuit unit including a switch, turning-on/off of which is controlled based on a control signal from a mount controller to control turning-on/off of mounts, and when the switch of the driving circuit unit is in the on state in response to the control signal, battery current is applied to coils of the mounts through the switch in the on state. In the state in which the switch of the driving circuit unit is turned off in response to a control signal from the mount controller, battery power is cut off by the switch in the off state, battery current is not applied to the coils of the mounts, and thus the mounts are in the off state.

In the present invention, in response to determining that the current vehicle driving state satisfies all of the predetermined mount-on conditions, the mount controller 13 may be configured to apply current of a battery 14 to the coils of the mounts 3 and 4 to turn on the mounts 3 and 4. In the state in which the mounts 3 and 4 are turned on by applying the current to the coils, attractive force generated between the coil and an armature of each of the mounts 3 and 4 moves the armature downwards against stiffness of a return spring and then fixes the armature, and thus, a second flow path (e.g., a vent aperture) is opened.

Accordingly, in the on state of the semi-active engine mounts 3 and 4, the armature of each of the mounts 3 and 4 is incapable of closing the second flow path, and the membrane may be easily moved, and thus, the dynamic characteristics and damping performance of the semi-active engine mount are low. On the other hand, the off state of the semi-active engine mounts 3 and 4 refers to a state in which the mount controller 13 (or coil driving units) does not output current to the coils of the semi-active engine mounts 3 and 4, i.e., a state in which the mount controller 13 does not apply operating current to the coils.

In the present invention, in response to determining that the current vehicle driving state corresponds to the predetermined mount-off conditions, the mount controller 13 does not output (apply) current to the coils of the mounts 3 and 4 turn off the mounts 3 and 4. In the state in which the mounts 3 and 4 are turned off by blocking the current supplied to the coils, the armature of each of the mounts 3 and 4 may be moved upwards by the return springs and then fixed, and thus the second flow path (the vent aperture) may be closed. In the off state of the semi-active engine mounts 3 and 4, the armature of each of the mounts 3 and 4 closes the second flow path, the membrane is fixed thereby to not be easily moved, and thus, the dynamic characteristics and damping performance of the semi-active engine mount are high.

In the present invention, the mount controller 13 may be configured to store real-time vehicle speed data at intervals of a predetermined time, compare a current vehicle speed SPEED_NEW with a previous vehicle speed SPEED_OLD, and thereby determine the driving state of the vehicle without adding any separate hardware. Particularly, the previous vehicle speed may refer to a vehicle speed at the predetermined time before the current time, and for example, the predetermined time may be set to 1 second previously. In other words, the previous vehicle speed may be a vehicle speed 1 second before the current time, and the current vehicle speed may be a real-time vehicle speed at the current time.

In the present invention, in a vehicle decelerating state in which the current vehicle speed is less than the previous vehicle speed or in a vehicle cruising state in which the current vehicle speed is equal to the previous vehicle speed, the mount controller 13 may be configured to determine that the current driving state of the vehicle corresponds to the driving conditions (e.g., PT shaking conditions) in which the driving performance of the vehicle is prioritized, or may be configured to determine that the vehicle travels on an uneven road.

Further, in a vehicle accelerating state in which the current vehicle speed is greater than the previous vehicle speed, the mount controller 13 may be configured to determine that the current driving state of the vehicle corresponds to the driving conditions (e.g., accelerating conditions) in which the NVH performance of the vehicle is prioritized and the vehicle travels on a road that is not an uneven road (e.g., a smooth road surface).

Hereinafter, a method for controlling a semi-active engine mount according to the present invention will be described in detail with reference to FIG. 2. In addition, Table 1 and Table 2 show the mount-on conditions and the mount-off conditions in the control of the semi-active engine mount according to the present invention.

TABLE 1

| Input signal | | | Previous mount state | Current mount state | Note |
|---|---|---|---|---|---|
| IGN1 | SPEED | RPM | | | |
| OFF | — | — | — | OFF | Prior to idling |
| ON | SPEED < D | — | — | OFF | Prior to idling |
| | | RPM < A | OFF | OFF | Prior to idling |
| | | A ≤ RPM < B | — | ON | Idling |
| | | B ≤ RPM < C | OFF | OFF | Hysteresis |
| | | B ≤ RPM < C | ON | ON | Hysteresis |
| | | C ≤ RPM | — | OFF | Driving |
| | SPEED ≥ D | — | — | OFF | Driving |

TABLE 2

| Input signal Speed | Current mount state | Note |
|---|---|---|
| E < SPEED < F | SPEED_OLD < SPEED_NEW | ON | Driving (accelerating) |
| | SPEED_OLD ≥ SPEED_NEW | OFF | Driving (cruising/decelerating) |

Referring to Table 1 and Table 2, it may be confirmed that driving conditions are subdivided based on the vehicle driving information collected by the vehicle, that is, the vehicle power state IGN1, the vehicle speed and the engine RPM. In Table 1 and Table 2, the current mount state indicates a control state of the mounts 3 and 4 to be achieved when each driving conditions are satisfied. In response to the mount controller 13 determining that each driving conditions are satisfied, the mount controller 13 may be configured to perform on-off control of the mounts 3 and 4 to achieve the current mount state corresponding to the corresponding driving conditions at the current control cycle.

The previous mount state indicates the previous control state of the mounts 3 and 4, i.e., the control state of the mounts 3 and 4 at the previous control cycle. Further, 'IGN1' indicates the vehicle power state, 'SPEED' indicates the vehicle speed, and 'RPM' indicates the engine RPM.

Moreover, in Table 1, 'A', 'B', 'C' and 'D' are values predetermined by the mount controller 13, and in more detail, 'A' indicates a first critical RPM, 'B' indicates a second critical RPM, 'C' indicates a third critical RPM, and 'D' indicates a third critical vehicle speed. In Table 1, the condition 'A≤RPM<B' corresponds to an engine idling state, and both the condition 'C≤RPM' and the condition 'SPEED≥D' correspond to a vehicle driving state other than the engine idling state. In addition, in Table 1, the reason why the current mount state varies based on the previous mount state under the condition 'B≤RPM<C' is due to hysteresis.

Figure 3:
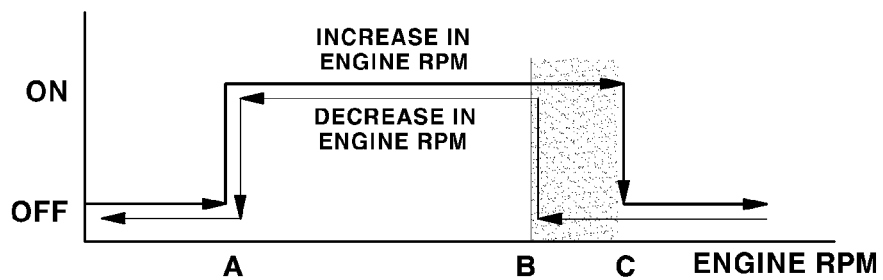
FIG. 3 is a graph representing hysteresis in the method according to the present invention.

FIG. 3 is a graph representing hysteresis in the method according to the present invention, a section B-C is a hysteresis section between idling of the engine and driving of the vehicle, and frequent turning-on/off of the mount may be prevented by setting the hysteresis section, accordingly. If the engine RPM at which on conversion between the on state and the off state of the mount is performed is not divided into the second critical RPM B and the third critical RPM C and the hysteresis condition is not checked in the determination, for example, if the on state or the off state of the mount is determined using only a result of comparing the engine RPM with the second critical RPM, when the engine RPM is finely changed around the second critical RPM B due to a disturbance or the like, the mount may frequently switch to the on state and the off state, thus reducing the durability of the actuator and causing excessive power consumption.

In Table 2, 'E' indicates a first critical vehicle speed, 'F' indicates a second critical vehicle speed, 'SPEED_OLD' indicates a previous vehicle speed, 'SPEED_NEW' indicates a current vehicle speed, and for example, the previous vehicle speed may be a vehicle speed 1 second before the current time. As described above, in Table 2, a condition 'SPEED_OLD<SPEED_NEW' corresponds to the accelerating state of the vehicle, and a condition 'SPEED_OLD≥SPEED_NEW' corresponds to the cruising or decelerating state of the vehicle.

The respective critical RPMs A, B and C in Table 1 may be set to satisfy the relationship 'A<B<C', the respective critical vehicle speeds E, F and D (km/hr) in Tables 1 and 2 may be set to satisfy the relationship 'E<F≤D', and 'SPEED' in Tables 1 and 2 basically indicates the current vehicle speed measured in real time. Further, in the present invention, the vehicle power state IGN1 may be divided into a power-on state (IGN1=ON) and a power-off state (IGN1=OFF), and a mount control state may be divided into a mount-on state in which current is output to the coil, and a mount-off state in which current is not output to the coil.

In the present invention, the values of the critical RPMs A, B and C and the values of the critical vehicle speeds D, E and F may be set in advance through preliminary tests and evaluation processes, and may be appropriately set, changed or tuned based on the specifications of the engine, the specifications of the mount, the driving performance and NVH performance desired to be achieved, etc. In the present invention, the mount controller 13 may be configured to turn on the mount only if both the driving conditions in Table 1 in which the current mount state is 'ON' (the mount-on conditions in Table 1) and the driving conditions in Table 2 in which the current mount state is 'ON' (the mount-on conditions in Table 2) are satisfied.

However, among the driving conditions set in Table 2, if the condition 'E<SPEED<F' is not satisfied, the state of the mounts 3 and 4 may be determined based on whether the driving conditions set in Table 1 are satisfied regardless of the driving conditions in Table 2. Examples are as follows.

Driving conditions in Table 1 in which the mount is turned on (the mount-on conditions in Table 1) are defined below:

1) the vehicle power is in the on state (IGN1=ON);
2) the vehicle speed is less than the third critical vehicle speed D (SPEED<D); and
3) the engine RPM is the first critical RPM A or greater and is less than the second critical RPM B (A≤RPM<B), i.e., in the engine idling state.

Further, the driving conditions in Table 2 in which the mount is turned on (the mount-on conditions in Table 2) are defined below:

4) the vehicle speed exceeds the first critical vehicle speed E and is less than the second critical vehicle speed F (E<SPEED<F); and
5) the current vehicle speed SPEED_NEW is greater than the previous vehicle speed SPEED_OLD (SPEED_OLD<SPEED_NEW), i.e., in the accelerating state, while traveling on a road that is an even road.

The above condition 5 may be replaced with the condition 'SPEED_OLD+G≤SPEED_NEW'. In particular, 'G' may be set to a positive value in the mount controller 13 and G is a factor for determining that the vehicle is being accelerated when a change in the vehicle speed reaches a designated level. As the value of 'G' is increased, the change in the vehicle speed at which the vehicle is defined as being accelerated may be increased, and as the value of 'G' is decreased, the change in the vehicle speed at which the vehicle is defined as being accelerated may be decreased. Therefore, as the value of 'G' is tuned to be increased (that is, as 'G' is tuned to have an increased value), the mount may be turned on due to the control logic in Table 2 under only the condition that the change in the vehicle speed is increased (e.g., greater than a predetermined speed), and thus, tuning focused on driving performance may be performed.

In the present invention, when both the mount-on conditions (1, 2 and 3) of Table 1 and the mount-on conditions (4 and 5) of Table 2 are satisfied, the mount controller 13 may be configured to apply current to the coils in the mounts 3 and 4 to turn on the mounts 3 and 4.

Other driving conditions in Table 1 in which the current mount state is 'ON' (the mount-on conditions in Table 1) are defined below:

1) the vehicle power is in the on state (IGN1=ON);
2) the vehicle speed is less than the third critical vehicle speed D (SPEED<D);
6) the engine RPM is within a hysteresis section, i.e., is the second critical RPM B or greater and is less than the third critical RPM C (B≤RPM<C), higher than in the engine idling state; and
7) the previous mount state is the on state.

In the same manner, when both the mount-on conditions (1, 2, 6 and 7) of Table 1 and the mount-on conditions (4 and 5) of Table 2 are satisfied, the mount controller 13 may be configured to maintain the on state of the mounts 3 and 4.

Meanwhile, when the engine RPM is within the hysteresis section, i.e., is the second critical RPM B or greater and is less than the third critical RPM C (B≤RPM<C) in Table 1 and the previous mount state is the off state, the mount controller 13 may be configured to maintain the off state of the mounts 3 and 4. Additionally, in remaining vehicle driving conditions in which both the mount-on conditions in Tables 1 and 2 are not satisfied, the mount controller 13 may be configured to convert the mounts 3 and 4 into the off state or maintain the off state of the mounts 3 and 4.

However, as described above, when among the driving conditions in Table 2, the condition 'E<SPEED<F' is not satisfied, the state of the mounts 3 and 4 may be determined based on whether the driving conditions in Table 1 are satisfied, regardless of the driving conditions in Table 2. For example, when the previous vehicle speed SPEED_OLD is the current vehicle speed SPEED_NEW or higher, the vehicle is in the cruising state or the decelerating state in which the driving performance of the vehicle is prioritized, or travels on an uneven road, and thus, the mount controller 13 may be configured to convert the mounts 3 and 4 into the off state or maintain the off state of the mounts 3 and 4.

As described above, when the current vehicle speed SPEED_NEW is greater than the previous vehicle speed SPEED_OLD in Table 2 (SPEED_OLD<SPEED_NEW), the vehicle may be determined to be in the driving conditions in which the NVH performance of the vehicle is prioritized. In particular, when all of the mount-on conditions in Table 1 are satisfied and the condition 'E<SPEED<F' in Table 2 is satisfied, the mount controller 13 may be configured to convert the mounts 3 and 4 into the on state or maintain the on state of the mounts 3 and 4.

Figure 4:
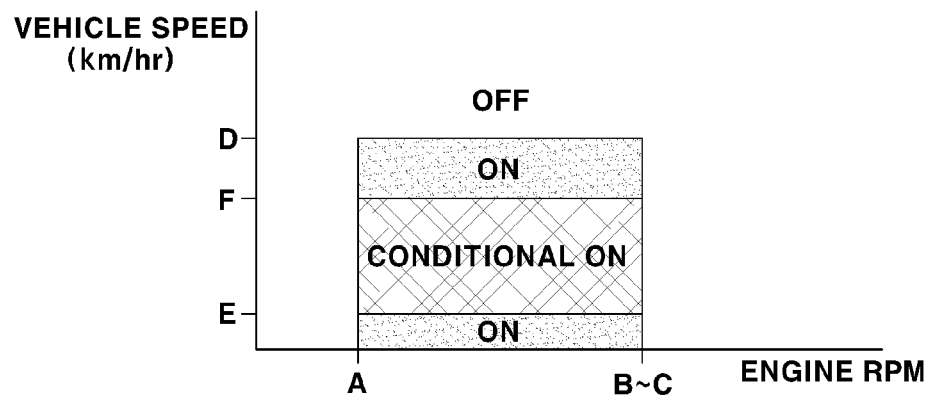
FIG. 4 is a graph representing mount control states depending on vehicle speed and engine RPM in the method according to the present invention.

FIG. 4 is a graph representing mount control states based on vehicle speed and engine RPM. When the vehicle speed is the third critical vehicle speed D or greater (D≥SPEED), the mounts 3 and 4 may be turned off regardless of the engine RPM, and when the vehicle speed is less than the third critical vehicle speed D (SPEED<D), a mount control state desired to be achieved may be one of the on state and the off state depending on the previous vehicle speed, the current vehicle speed and the engine RPM.

Accordingly, in the present invention, the mounts 3 and 4 may be turned on in the conditions in which the NVH performance of the vehicle is prioritized, and may be turned off in the conditions in which the driving performance of the vehicle is prioritized, and thereby, the operating range of the semi-active engine mounts 3 and 4 is optimized. The process for controlling the semi-active engine mounts 3 and 4 has been described above with reference to Tables 1 and 2, and respective operations of the process will be described below with reference to FIG. 2.

First, the mount controller 13 may be configured to confirm the vehicle power state IGN1 (S11), and determine whether the engine is in the on state by comparing the engine RPM with the first critical RPM A when the vehicle is in the power-on state (IGN1=ON) (S12). In particular, when the engine RPM is the first critical RPM A or greater (A≤RPM), the mount controller 13 may be configure to determine that the engine is in the on state, and determine whether the driving vehicle satisfies a condition that requires a determination as to whether the current driving state of the vehicle corresponds to the driving conditions in which the NVH performance is prioritized or the driving conditions in which the driving performance is prioritized from a detected vehicle speed SPEED (S13).

Accordingly, the mount controller 13 may be configured to confirm whether the vehicle speed SPEED is within a predetermined range, i.e., whether the vehicle speed SPEED exceeds the first critical vehicle speed E and is less than the second critical vehicle speed F. When the vehicle speed SPEED is within the predetermined range, i.e., when the vehicle speed SPEED exceeds the first critical vehicle speed E and is less than the second critical vehicle speed F (E<SPEED<F), the mount controller 13 may be configured to determine whether the current driving state of the vehicle corresponds to the driving conditions in which the NVH performance is prioritized are satisfied from vehicle speed change information (S14).

In particular, the mount controller 13 may be configured to determine whether the current driving state of the vehicle corresponds to the driving conditions in which the NVH performance is prioritized by comparing the current vehicle speed SPEED_NEW with the previous vehicle speed SPEED_OLD. More particularly, the mount controller 13 may be configured to determine whether the condition 'SPEED_OLD+G≤SPEED_NEW (or SPEED_OLD< SPEED_NEW)' is satisfied, and determine that the current driving state of the vehicle corresponds to the driving conditions in which the NVH performance is prioritized when the condition 'SPEED_OLD+G≤SPEED_NEW' is satisfied.

Accordingly, in response to determining that the current driving state of the vehicle corresponds to the driving conditions in which the NVH performance is prioritized, the mount controller 13 may be configured to determine whether it is necessary to reduce the dynamic characteristics of the mounts 3 and 4 in the current driving state of the vehicle from information about the engine RPM (S16).

In particular, the mount controller 13 may be configured to compare the engine RPM with the second critical RPM B. In response to determining that the engine RPM is less than the second critical RPM B, i.e., is within the engine idling section (RPM<B), the motor controller 13 may be configured to determine that it is necessary to reduce the dynamic characteristics of the mounts 3 and 4, and apply current to the coils in the mounts 3 and 4 \ to turn on the mounts 3 and 4 (S19).

On the other hand, in response to determining that the engine RPM is the second critical RPM B or greater and is less than the third critical RPM C, i.e., is within the hysteresis section (B≤SPEED<C), the mount controller 13 may be configured to maintain the previous state of the mounts 3 and 4 (S17-S20). In other words, when the previous state of the mounts 3 and 4 is the on state in S18, the mount controller 13 may be configured to maintain the on state of the mounts 3 and 4 (S19), and when the previous state of the mounts 3 and 4 is the off state in S18, the mount controller 13 may be configured to maintain the off state of the mounts 3 and 4 (S20). When power is not applied to the vehicle and thus the vehicle is in the power-off state in S11, or when the engine is not turned on (RPM<A) in S12, the mount controller 13 may be configured to maintain the off state of the mounts 3 and 4.

Further, the current driving state of the vehicle corresponds to driving conditions other than the driving conditions in which the NVH performance is prioritized, i.e., the driving conditions in which the driving performance is prioritized or the conditions in which the vehicle travels on an uneven road (SPEED_OLD+G>SPEED_NEW or SPEED_OLD≥SPEED_NEW), in S14, the mount controller 13 may be configured to maintain the off state of the mounts 3 and 4. In addition, in response to determining that the engine RPM is the third critical RPM C or greater (RPM≥C) in S17, the mount controller 13 may be configured to adjust the mounts 3 and 4 to be in the off state.

When the vehicle does not satisfy the condition that requires the determination as to whether the current driving state of the vehicle corresponds to the driving conditions in which the NVH performance is prioritized or the driving conditions in which the driving performance is prioritized, i.e., does not satisfy the condition 'E<SPEED<F', in S13, the mount controller 13 may be configured to confirm whether the vehicle satisfies a condition that does not require this determination from vehicle speed information in S15.

In particular, the mount controller 13 may be configured to compare the current vehicle speed SPEED with the third critical vehicle speed D (S15), and when the current vehicle speed SPEED is less than the third critical vehicle speed D (SPEED<D), determine that the vehicle is in a state in which the determination as to whether the current driving state of the vehicle corresponds to the driving conditions in which the NVH performance is prioritized or the driving conditions in which the driving performance is prioritized is not required.

Figure 2:
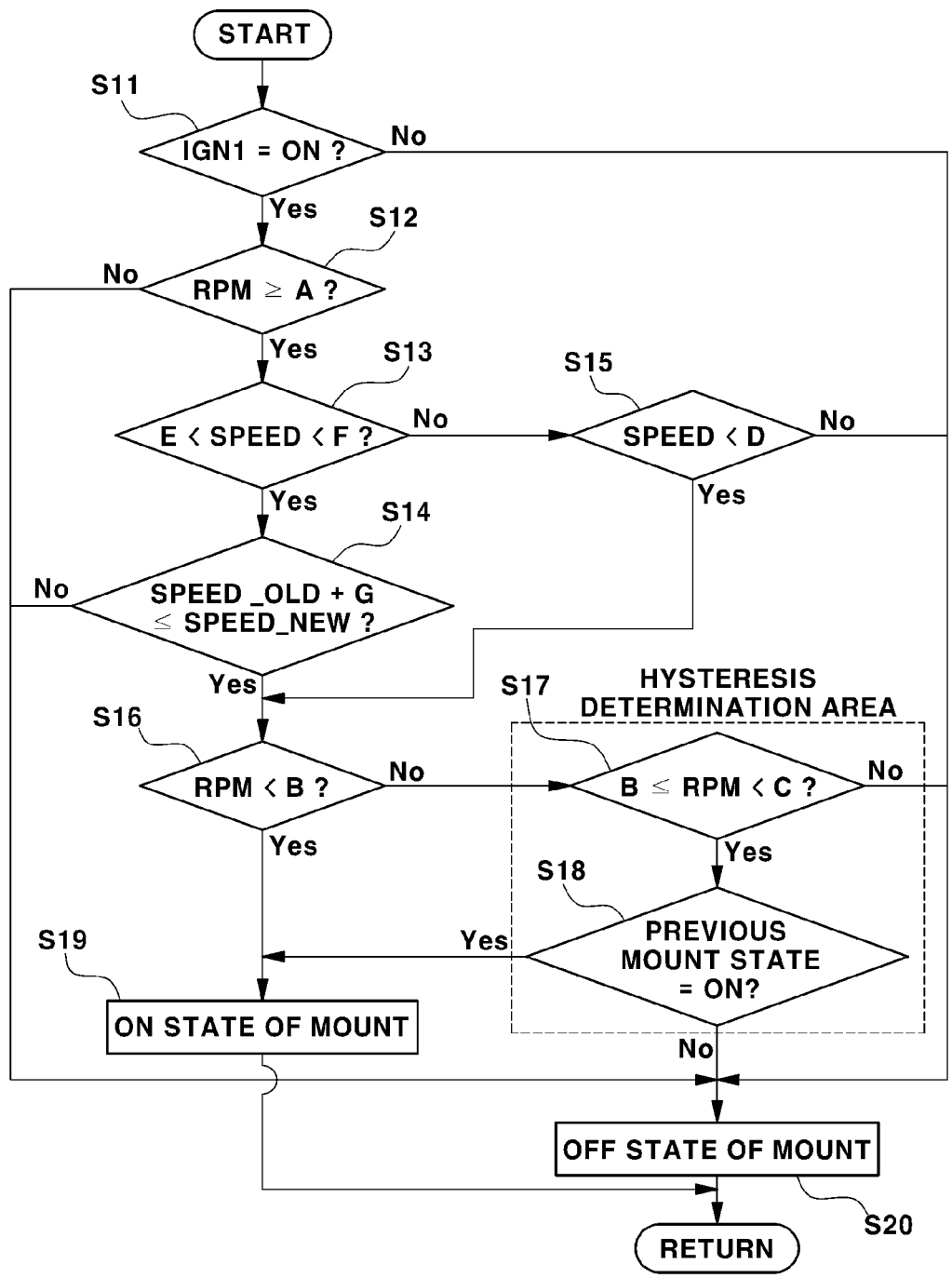
FIG. 2 is a flow chart illustrating a method for controlling a semi-active engine mount according to the present invention.

In response to determining that the current vehicle speed SPEED is less than the third critical vehicle speed D (SPEED<D), the control process moves to S16 in FIG. 2, and the mount controller 13 performs S16 to S20. Particularly, the on-off control of the mounts 3 and 4 may be performed based on only the engine RPM and the previous mount state. On the other hand, when the current vehicle speed SPEED is the third critical vehicle speed D or greater in S15, the mount controller 13 may be configured to adjust the mounts 3 and 4 to be in the off state.

As described above, in the present invention, the driving conditions of the vehicle to determine the on and off states of the mount may be further subdivided, thereby being capable of increasing both the NVH performance and the driving performance of the vehicle merely by improving the control logic without adding hardware, and reducing noise and vibration generated in the mount under specific driving conditions, such as when traveling on an uneven road.

Particularly, whether the current driving state of the vehicle corresponds to the driving conditions in which the NVH performance is prioritized or the driving conditions in which the driving performance is prioritized may be determined, the mount may be turned on when the current driving state of the vehicle corresponds to the driving conditions in which the NVH performance is prioritized, and the mount may be turned off when the current driving state of the vehicle corresponds to the driving conditions in which the driving performance is prioritized or when the vehicle travels on an uneven road, thereby being capable of optimizing the operating range of the semi-active engine mount.

As is apparent from the above description, in a method for controlling a semi-active engine mount according to the present invention, driving conditions to determine the on and off states of the mount are further subdivided, and thus, both NVH performance and driving performance of a vehicle may be simultaneously improved merely by improving control logic without adding hardware, thereby being capable of extending an operating range of the semi-active engine mount so that a semi-active engine mount system used to improve the NVH performance only during idling may also be used to improve the NVH performance during driving, and reducing noise and vibration generated in the mount under specific driving conditions, such as when traveling on an uneven road.

Particularly, whether the current driving state of the vehicle satisfies the driving conditions in which the NVH performance is prioritized or the driving conditions in which the driving performance is prioritized may be determined, the mount may be turned on when the current driving state of the vehicle satisfies the driving conditions in which the NVH performance is prioritized, and the mount may be turned off when the current driving state of the vehicle satisfies the driving conditions in which the driving performance is prioritized, thereby making it possible to optimize the operating range of the semi-active engine mount.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for controlling a semi-active engine mount having a first flow path, a second flow path, and an actuator configured to open and close the second flow path, the method comprising:
storing, by a mount controller, real-time vehicle speed data at intervals of a predetermined time;
determining, by the mount controller, whether an engine is in an idling state;
determining, by the mount controller, whether a current driving state of a vehicle corresponds to predetermined conditions in which noise and vibration performance is prioritized based on vehicle speed change information, in response to determining that the engine is in the idling state; and
adjusting, by the mount controller, the semi-active engine mount to be in an on state to cause the actuator to open the second flow path, in response to determining that the current driving state of a vehicle in the idling state of the engine corresponds to the predetermined conditions in which noise and vibration performance is prioritized,
wherein the vehicle speed change information includes information regarding a change in a previous vehicle speed set to a vehicle speed at a predetermined time before a current time, and a change in a current vehicle speed.

2. The method of claim 1, wherein, the determining of whether the current driving state of the vehicle corresponds to the predetermined conditions in which noise and vibration performance is prioritized includes determining, by the mount controller, that the current driving state of the vehicle corresponds to the predetermined conditions in which noise and vibration performance is prioritized in response to determining that the current vehicle speed exceeds the previous vehicle speed.

3. The method of claim 1, wherein, the determining of whether the current driving state of the vehicle corresponds to the predetermined conditions in which noise and vibration performance is prioritized includes determining, by the mount controller, that the current driving state of the vehicle corresponds to the predetermined conditions in which noise and vibration performance is prioritized in response to determining that a condition 'the previous vehicle speed+ G≤the current speed (G being a predetermined value)' is satisfied.

4. The method of claim 1, further comprising controlling, by the mount controller, the semi-active engine mount to be in an off state so that a closed state of the second flow path is maintained, in response to determining that the current driving state of the vehicle does not correspond to the predetermined conditions in which noise and vibration performance is prioritized.

5. The method of claim 1, further comprising:
determining, by the mount controller, whether the current vehicle speed is within a predetermined range, in the idling state of the engine; and
determining, by the mount controller, whether the current driving state of the vehicle corresponds to the predetermined conditions in which noise and vibration performance is prioritized, and adjusting the semi-active engine mount to be in the on state, in response to determining that the current vehicle speed is within the predetermined range.

6. A control system for a semi-active engine mount, comprising:
a first flow path;
a second flow path;
an actuator configured to open and close the second flow path; and
a mount controller configured to:
store real-time vehicle speed data at intervals of a predetermined time;
determine whether an engine is in an idling state;
determine whether a current driving state of a vehicle corresponds to predetermined conditions in which noise and vibration performance is prioritized based on vehicle speed change information, in response to determining that the engine is in the idling state; and
adjust the semi-active engine mount to be in an on state to cause the actuator to open the second flow path, in response to determining that the current driving state of a vehicle in the idling state of the engine corresponds to the predetermined conditions in which noise and vibration performance is prioritized;
wherein the vehicle speed change information includes information regarding a change in a previous vehicle speed set to a vehicle speed at a predetermined time before a current time, and a change in a current vehicle speed.

* * * * *